(12) United States Patent
Cohen et al.

(10) Patent No.: US 10,942,834 B2
(45) Date of Patent: Mar. 9, 2021

(54) REAL-TIME PERSONALIZATION PRODUCT TRACKING B2B/B2C

(71) Applicant: GAINSIGHT, INC., San Francisco, CA (US)

(72) Inventors: Elad Cohen, Tel Aviv (IL); Michael Kopaniov, Ramat Gan (IL); Moran Ohana, Petach Tikva (IL); Gil Michlin, San Mateo, CA (US); Michael Alon, Sunnyvale, CA (US)

(73) Assignee: GAINSIGHT, INC., San Francisco, CA (US)

( * ) Notice: Subject to any disclaimer, the term of this patent is extended or adjusted under 35 U.S.C. 154(b) by 0 days.

(21) Appl. No.: 16/053,497

(22) Filed: Aug. 2, 2018

(65) Prior Publication Data

US 2019/0042203 A1 Feb. 7, 2019

Related U.S. Application Data

(60) Provisional application No. 62/540,181, filed on Aug. 2, 2017.

(51) Int. Cl.
*G06F 11/34* (2006.01)
*H04L 29/08* (2006.01)
(Continued)

(52) U.S. Cl.
CPC ............ *G06F 11/3438* (2013.01); *G06F 8/35* (2013.01); *G06F 8/77* (2013.01); *G06N 20/00* (2019.01);
(Continued)

(58) Field of Classification Search
CPC ..... G06F 8/24; G06F 8/35; G06F 8/77; G06F 11/34; G06N 20/00; H04L 67/22; H04L 67/125; H04L 67/306; H04L 67/34
(Continued)

(56) References Cited

U.S. PATENT DOCUMENTS 6,151,707 A * 11/2000 Hecksel ................. G06F 8/61
717/178
7,673,287 B2 * 3/2010 Mayer-Ullmann ....... G06F 8/73
717/124
(Continued)

OTHER PUBLICATIONS

Sun, J., et al., Study of Consumer Acceptance in E-commerce by Integrating Technology Acceptance Model with Task-Technology Fit Model, Int'l Conf on Wireless Communications, Networking and Mobile Computing, 2007, pp. 3621-3624, [retrieved on Oct. 31, 2020], Retrieved from the Internet: <URL:http://ieeexplore.ieee.org/>.*
(Continued)

*Primary Examiner* — Geoffrey R St Leger
(74) *Attorney, Agent, or Firm* — Browdy and Neimark, P.L.L.C.

(57) ABSTRACT

A method for personalizing content and functionality in a computer application includes: learning user behavior based on detected input and feature usage by analyzing communication requests and response between client device and application services; creating a product adoption learning model based on user behavior and profile by applying training algorithm of feature usage in relation to user behavior following the feature usage of the user throughout the user lifecycle; and determining feature adoption schedule and time window and applying the adoption learning model based on user behavior, user profile and feature usage.

20 Claims, 11 Drawing Sheets

(51) Int. Cl.
*G06F 8/77* (2018.01)
*G06N 20/00* (2019.01)
*G06F 8/35* (2018.01)
*G06F 8/20* (2018.01)

(52) U.S. Cl.
CPC ............ *H04L 67/125* (2013.01); *H04L 67/22* (2013.01); *H04L 67/306* (2013.01); *H04L 67/34* (2013.01); *G06F 8/24* (2013.01)

(58) Field of Classification Search
USPC .................................................. 717/102, 104
See application file for complete search history.

(56) References Cited

U.S. PATENT DOCUMENTS

| | | | | |
|---|---|---|---|---|
| 8,352,535 B2* | 1/2013 | Peled | ..................... | G06F 21/10 709/200 |
| 8,381,180 B2* | 2/2013 | Rostoker | ................ | G06Q 30/02 717/101 |
| 8,386,966 B1* | 2/2013 | Attinasi | .............. | G06F 11/3438 715/866 |
| 9,495,686 B1* | 11/2016 | Stekkelpak | ............. | H04L 67/34 |
| 9,846,634 B2* | 12/2017 | Ji | ........................ | G06F 11/3688 |
| 2003/0195963 A1* | 10/2003 | Song | .................... | H04L 67/142 709/227 |
| 2005/0288939 A1* | 12/2005 | Peled | ...................... | G06F 21/10 709/229 |
| 2007/0083854 A1* | 4/2007 | Mayer-Ullmann | ......................... | G06F 11/3696 717/124 |
| 2008/0127052 A1* | 5/2008 | Rostoker | ................... | G06F 8/34 717/105 |
| 2015/0220616 A1* | 8/2015 | Kim | ....................... | G06F 16/951 707/722 |
| 2015/0278706 A1* | 10/2015 | Shivashankar | ........ | G06N 20/00 706/12 |
| 2015/0378876 A1* | 12/2015 | Ji | ........................ | G06F 11/3688 714/38.1 |
| 2018/0174070 A1* | 6/2018 | Hoffman | ................ | G06N 7/005 |
| 2018/0212837 A1* | 7/2018 | Kalluri | ................ | G06Q 30/0202 |
| 2018/0300494 A1* | 10/2018 | Avidan | ................ | G06F 21/6218 |

OTHER PUBLICATIONS

Bhatt, R., et al., Predicting product adoption in large-scale social networks, CIKM '10: Proceedings of the 19th ACM international conference on Information and knowledge management, Oct. 2010, pp. 1039-1048, [retrieved on Oct. 31, 2020], Retrieved from the Internet: <URL:http://dl.acm.org/>.*

* cited by examiner

REAL-TIME PERSONALIZATION PRODUCT TRACKING B2B/B2C

FIELD OF THE INVENTION

The invention generally relates to the field of personalizing software applications driven by feature usage and particularly to the field of generating product adoption learning model based on user behavior, user attributes and feature usage.

SUMMARY OF INVENTION

The present invention provides a method for personalizing content and functionality in computer application. The method comprising the steps of:

Learning user behavior based on detected input and feature usage by analyzing communication requests and response between client device and application services;

Creating product adoption learning model based on user behavior and profile by applying training algorithm of feature usage in relation to user behavior following the feature usage of the user throughout the user lifecycle;

Determining feature adoption schedule and time window applying adoption learning model based on user behavior, user profile and feature usage;

The present invention provides a method for personalizing content and functionality in computer application, implemented by a server module and a plurality of household client modules, wherein each of said a server module and plurality of household client modules comprising one or more processors, operatively coupled to non-transitory computer readable storage devices, on which are stored modules of instruction code, wherein execution of said instruction code by said one or more processors implements the following actions:

Learning user behavior based on detected input and feature usage based on analyzing communication requests and response between client device and application services;

Creating product adoption learning model based on user behavior and profile by applying training algorithm of content exposure feature usage in relation to user behavior action following the feature usage or content exposure to the user throughout user lifecycle;

Determining feature adoption schedule and time window applying adoption learning model based on user current behavior, user profile and feature usage According to some embodiments of the present invention the creating the adoption model further include analyzing user a behavior action, after feature usage or content exposure by identifying engagement or adoption actions indicating a successful usage of the application, feature or module;

According to some embodiments of the present invention the creating the adoption model further includes identifying high value feature or content which lead to successful and shorter time of feature adoption;

According to some embodiments of the present invention the creation of adoption model further comprise detecting effective time window of feature adoption, by statistically analyzing number of users adapting the feature within each time period.

According to some embodiments of the present invention the user behavior learning further comprises analyzing sequence of DOM elements for identifying user actions and usage of features of the application, feature or modules.

According to some embodiments of the present invention the method further comprising the step of detecting application features using learning algorithm based on analyzing communication requests and response between the client and the personalization system;

According to some embodiments of the present invention the method further comprising the step of personalizing content and determining next best action by applying adoption learning model based on user current behavior user profile and feature usage.

According to some embodiments of the present invention the method further comprising, wherein on each product release unique identifiers are auto-detected automatically recomputing the identifiers in case of a change.

According to some embodiments of the present invention the method further comprising the step of detecting features/actions applied by analyzing sequences of identified unique identifiers According to some embodiments of the present invention the user behavior learning Using CSS selectors for identifying unique identifier within the Dom page based on Xpath navigation though the HTML/XML doc, Css class, HTML ID or relative path anchor elements (web sources)

The present invention provides a system for personalizing content and functionality in computer application, comprising a server module and a plurality of household client modules, wherein:

a. each of said a server module and plurality of household client modules comprising one or more processors, operatively coupled to non-transitory computer readable storage devices, on which are stored modules of instruction code, wherein execution of said instruction code by said one or more processors implements the function of the said server and client modules:

Learning module for Learning user behavior based on detected input and feature usage based on analyzing communication requests and response between client device and application services;

Feature Adoption Analysis Module Creating product adoption learning model based on user behavior and profile by applying training algorithm of content exposure feature usage in relation to user behavior action following the feature usage or content exposure to the user throughout user lifecycle;

Feature Recommendation for determining feature adoption schedule and time window applying adoption learning model based on user current behavior, user profile and feature usage According to some embodiments of the present invention the adoption model analyze user a behavior action, after feature usage or content exposure by identifying engagement or adoption actions indicating a successful usage of the application, feature or module;

According to some embodiments of the present invention the adoption model identifies high value feature or content which lead to successful and shorter time of feature adoption;

According to some embodiments of the present invention the adoption model detect effective time window of feature adoption, by statistically analyzing number of users adapting the feature within each time period.

According to some embodiments of the present invention the user behavior learning comprises analyzing sequence of DOM elements for identifying user actions and usage of features of the application, feature or modules.

According to some embodiments of the present invention the learning module further comprising the step of detecting application features using learning algorithm based on analyzing communication requests and response between the client and the personalization system;

According to some embodiments of the present invention the feature Adoption Analysis Module further comprise the step of personalizing content and determining next best action by applying adoption learning model based on user current behavior, user profile and feature usage.

According to some embodiments of the present invention on each product release unique identifiers are auto-detected automatically recomputing the identifiers in case of a change.

BRIEF DESCRIPTION OF THE DRAWINGS

For a better understanding of various embodiments of the invention and to show how the same may be carried into effect, reference will now be made, purely by way of example, to the accompanying drawings in which like numerals designate corresponding elements or sections throughout With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF SOME EMBODIMENTS OF THE INVENTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Definitions/Glossary

Personalization system, is the main part of the present invention system for tracking and engaging users behavior inside the application via personalized content, recommended feature adoption module and suggesting next action/feature in real time User A user of an online product or services of an application that is being tracked by the tracking module of the personalization system, the user is tracked through multiple stages: anonymous (ID: web visitor–cookies+IP), lead (ID: filled out a form) and application user (logged into the online product or service–ID: user id). Trial period, adoption period, mature period User Role: Product Manager/Product Marketing An admin user that works with the personalization system to track users, analyze their behavior and engage them. the admin's role is to drive awareness and adoption of the online product or service.

a. Responsible for creating the content for personalized engagements

Online Product or Service b. every digital product that offers any type of users it's functionality via an online channel like website, web-application, mobile application.

Insights Bot—Helps the Admin User with Insights and Analytics c. Analyzes segments, campaigns and content performance (conversion rates, adoption metrics) and assists the admin user (product manager/product marketing manager) with data analysis of the system reports such as user behavior and engagement metrics. The bot uses machine learning to identify meaningful events using deep learning and using anomaly statistical algorithms to identify emerging trends and anomalies in data.

Product Mapper d. Detecting module that identifies what is a feature in an application and how to uniquely identify it, sustain updates of features done by engineers (changing color, text) the machine learning helps identifying it as the same feature Golden Feature Analysis e. Learning model to identify high value features, uses tracked user and usage data for training Feature Recommender f. Based on features consumed and your user profile—recommending the next feature you might like or find as useful.

Key Adoption Drivers g. Indicates main user attributes, user behavior and feature usage that leads to higher adoption results.

The present invention system automatically learns, what are the features and what meaningful user events throughout the user/customer lifecycle when using an application, and key adoption drivers.

Figure 1:
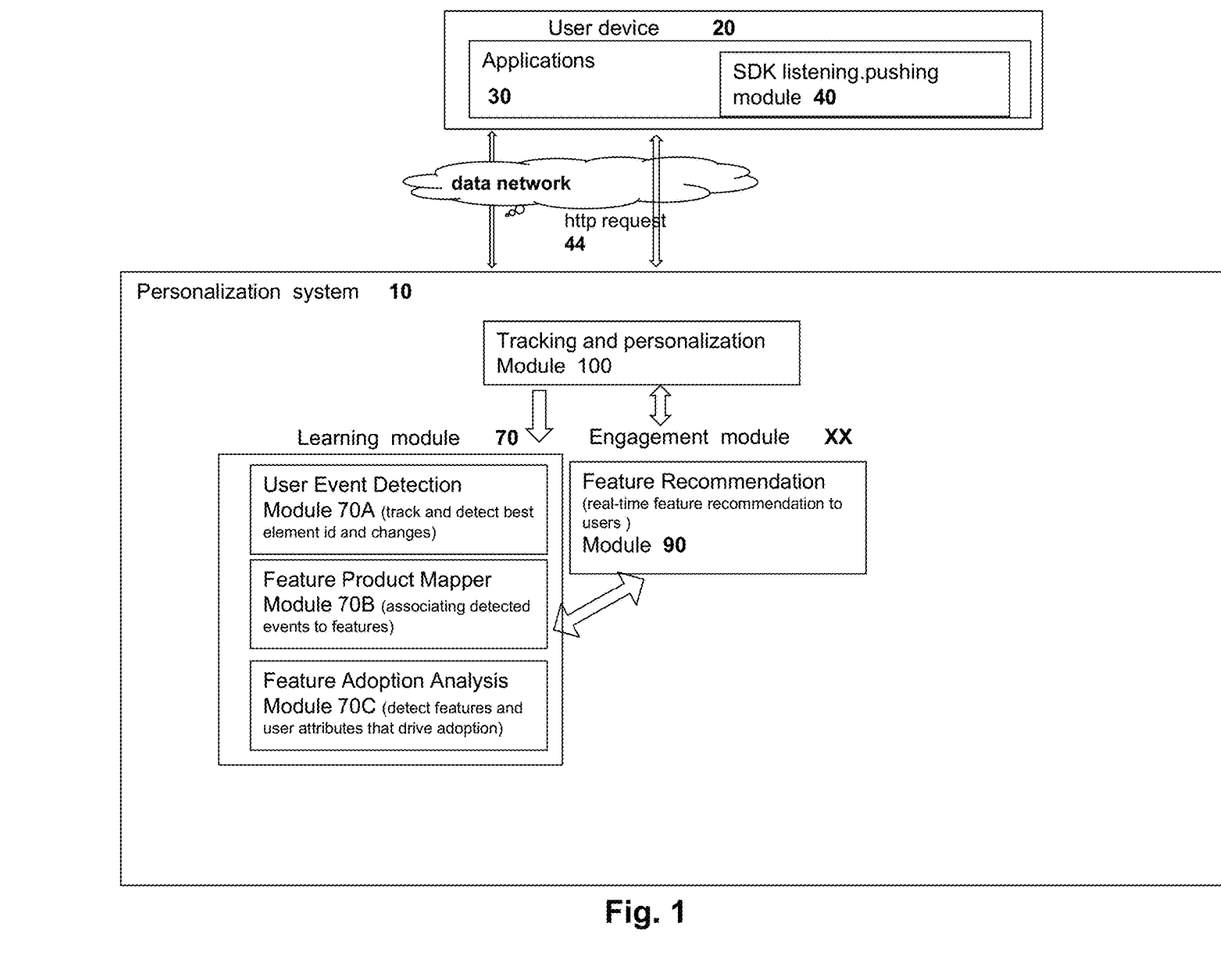
FIG. 1 is a block diagram, depicting a high level overview of the proposed system for tracking and analyzing user behavior and feature usage inside the application on the user device, engaging users with personalized content, according to some embodiments of the present invention.

FIG. 1 is a block diagram, depicting a high-level overview of the proposed system for tracking and analyzing user behavior and feature usage inside an application on the user device and engaging users with personalized content, according to some embodiments of the present invention.

Each monitored application 30 include bi-directional SDK that tracks and displays content module 40 for monitoring and tracking data through communication requests such as HTTP and HTTPS protocols to the personalization system 10, pulling data from the personalization system 10 back to the application 30. The personalization system 10 which can be implemented on a cloud server runtime, is comprised from a tracking and personalization module 100 which collects, logs and stores all monitored data sent by the SDK listening/tracking module 40 and displays content/campaign management received from the personalization system.

The user event detection module 70A analyzes tracked data of user behavior in relation to user profile and context with the application for identifying unique identifiers.

Based on analyzed data of user behavior, product feature mapper module, 70B detects and discovers features in an app and also tracks which features are consumed and used by the user, based on analysis of tracked data and the mapped application features structure and event flow, without requiring prior knowledge of the application features or coding skills.

Feature adoption module 70B creates adoption learning model based on the product mapper tracking and real-time usage of features by the users using learning algorithm, which analyzes feature usage and adoption activities Based on the adoption learning model, the tracking personalization module 50 changes the application content and drives the most relevant in-application campaigns in real-time by applying the model on current users' profiles, activity and the application context.

Based on the adoption learning model, the recommendation module 90 provides in real-time next best feature recommendation or action by applying the adoption model, on current user's profiles, activity and the application context. The recommendation module 90 further provides recommended feature adoption time window based on the adoption learning period.

Figure 2:
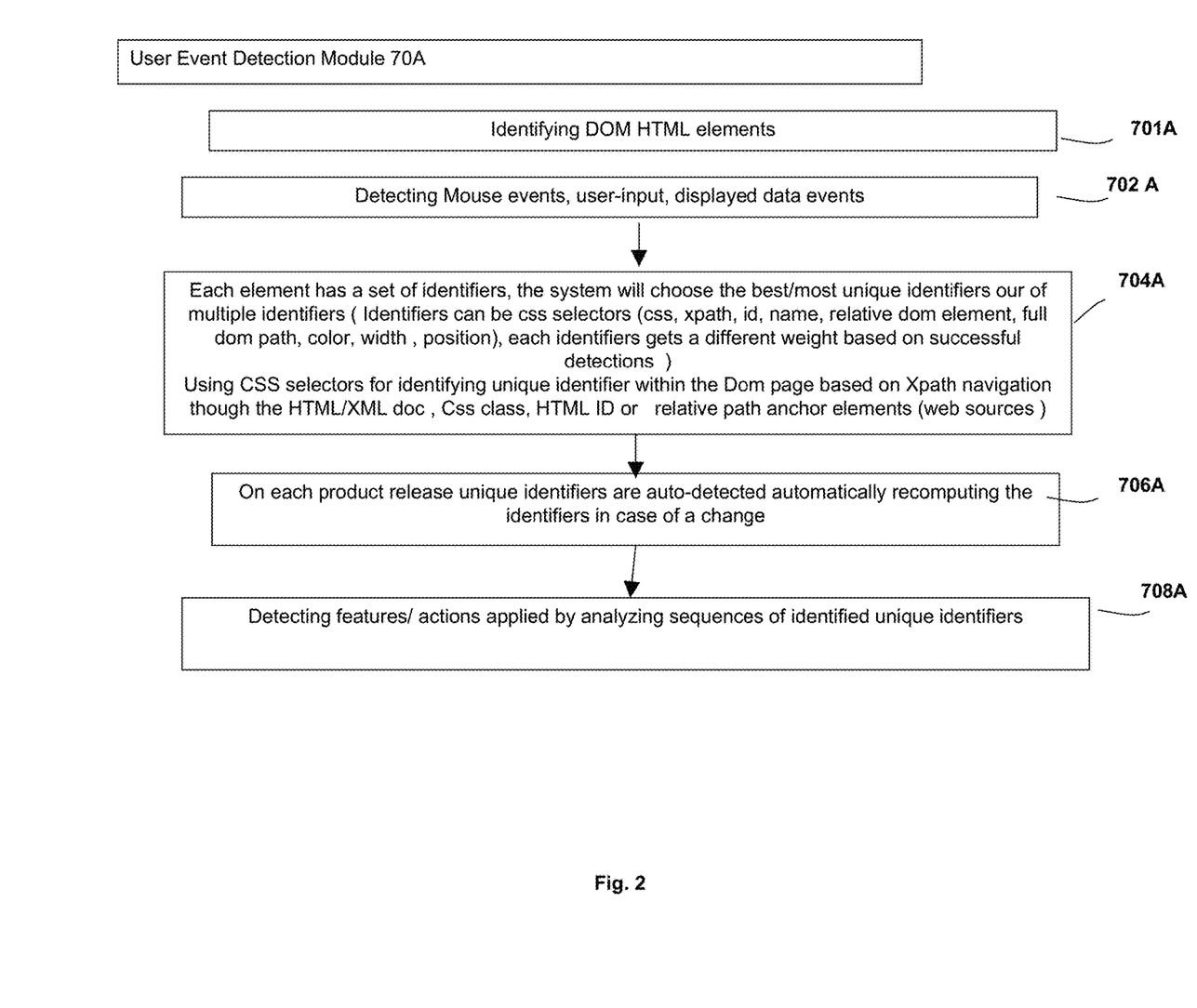
FIG. 2 is a flow diagram, depicting user event detection module according to some embodiments of the present invention.

FIG. 2 is a flow diagram, depicting user event detection module 70a according to some embodiments of the present invention.

The module 70A Identifies DOM HTML elements from the communication requests (step) 701A and detects Mouse events, user-input, displayed data events (702A)

Each element has a set of potential identifiers, the system will choose the best/most unique identifiers out of multiple identifiers (Identifiers can be css selectors (css, xpath, id, name, relative DOM element, full DOM path), each identifier gets a different weight based on successful detections).

According to some embodiments of the present invention for each DOM HTML is calculated strength parameter which indicate uniqueness of using the Dom Element in a web application. Based on this strength parameter are filtered out from many potential DOM element for identifying the DOM elements having the highest strength values. For Example—random IDs are disqualify although they have unique ID will probably change in each user interaction therefor are not qualified for tracking. Optionally is provided user feedback which indicate the strength of uniqueness (see FIG. 10—Green line)

Using CSS selectors for identifying unique identifier within the Dom page based on Xpath navigation through the HTML/XML doc, Css class, HTML ID or relative path anchor elements (web sources) (step 704A).

The module further performs content analysis based on Text within the DOM relevant to the clicked features (e.g. value in shopping cart).

The module further performs content analysis based on n-Child within the DOM element, relevant to the clicked features (e.g. value in shopping cart).

On each product release unique identifiers are auto-detected (in case these were changed) automatically recomputing the identifiers in case of a change. (step 706A).

The module further detects actions performed by the user by analyzing the sequences of the identified unique identifiers. (step 708A).

Figure 3:
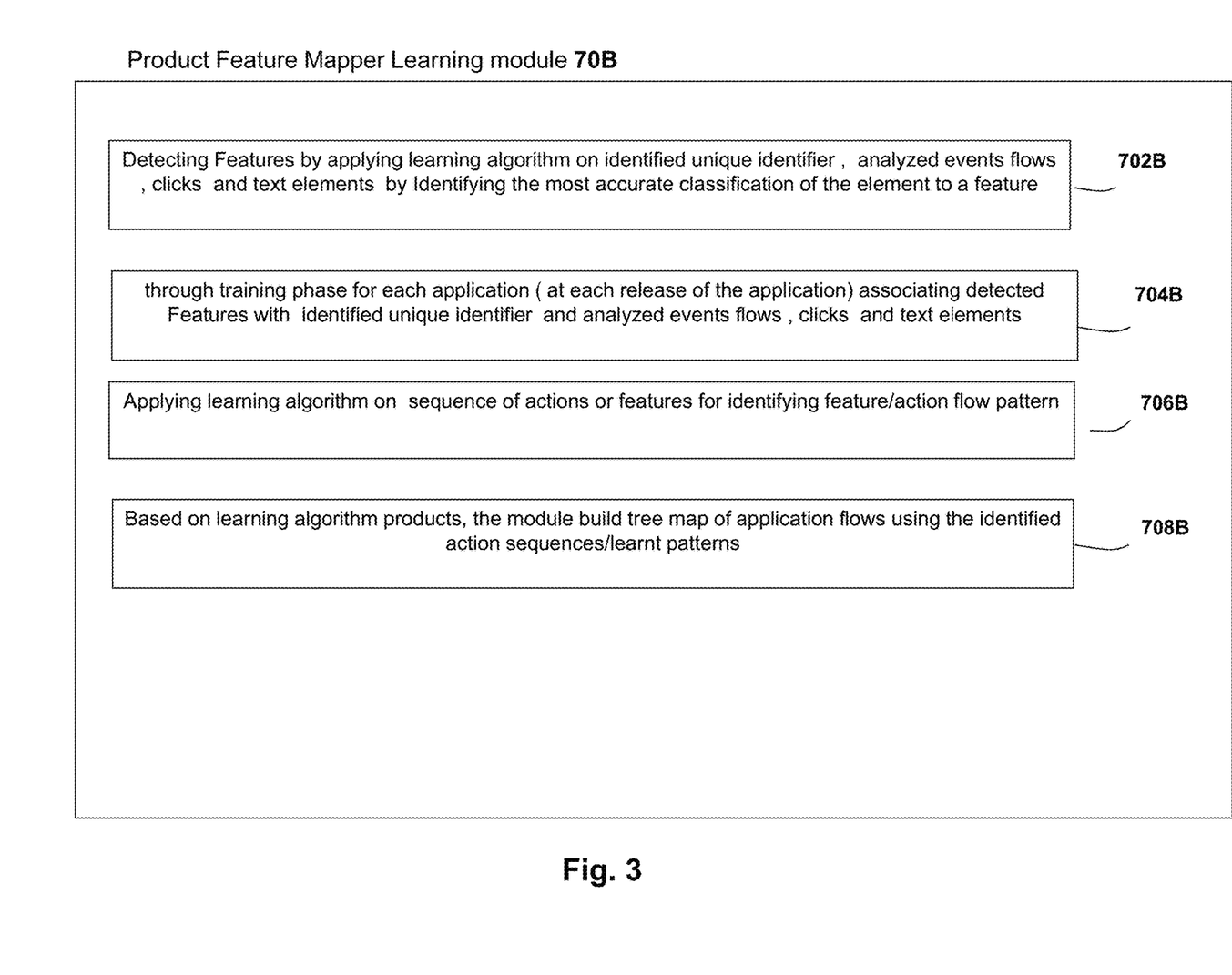
FIG. 3 is a flow diagram, depicting product feature tree mapper module according to some embodiments of the present invention.

FIG. 3 is a flow diagram, depicting product feature mapper module according to some embodiments of the present invention.

The product feature mapper module 70B, detects features by applying learning algorithm on identified unique identifiers, clicks and text elements by identifying the most accurate classification of the element to a feature (step 702B).

Through training phase for each application (at each release of the application) associating detected features with identified unique identifier and analyzed events, clicks and text elements. (step 704B).

The module further Applies learning algorithm on sequence of actions or features for identifying action flow patterns (step 706B).

Based on learning algorithm products, the module builds tree map of application features and usage flow using the identified action sequences/learnt patterns (step 708a).

The tree map of the application features hierarchy is associated to user event or account event to the relevant feature under the tree map hierarchy.

Figure 4:
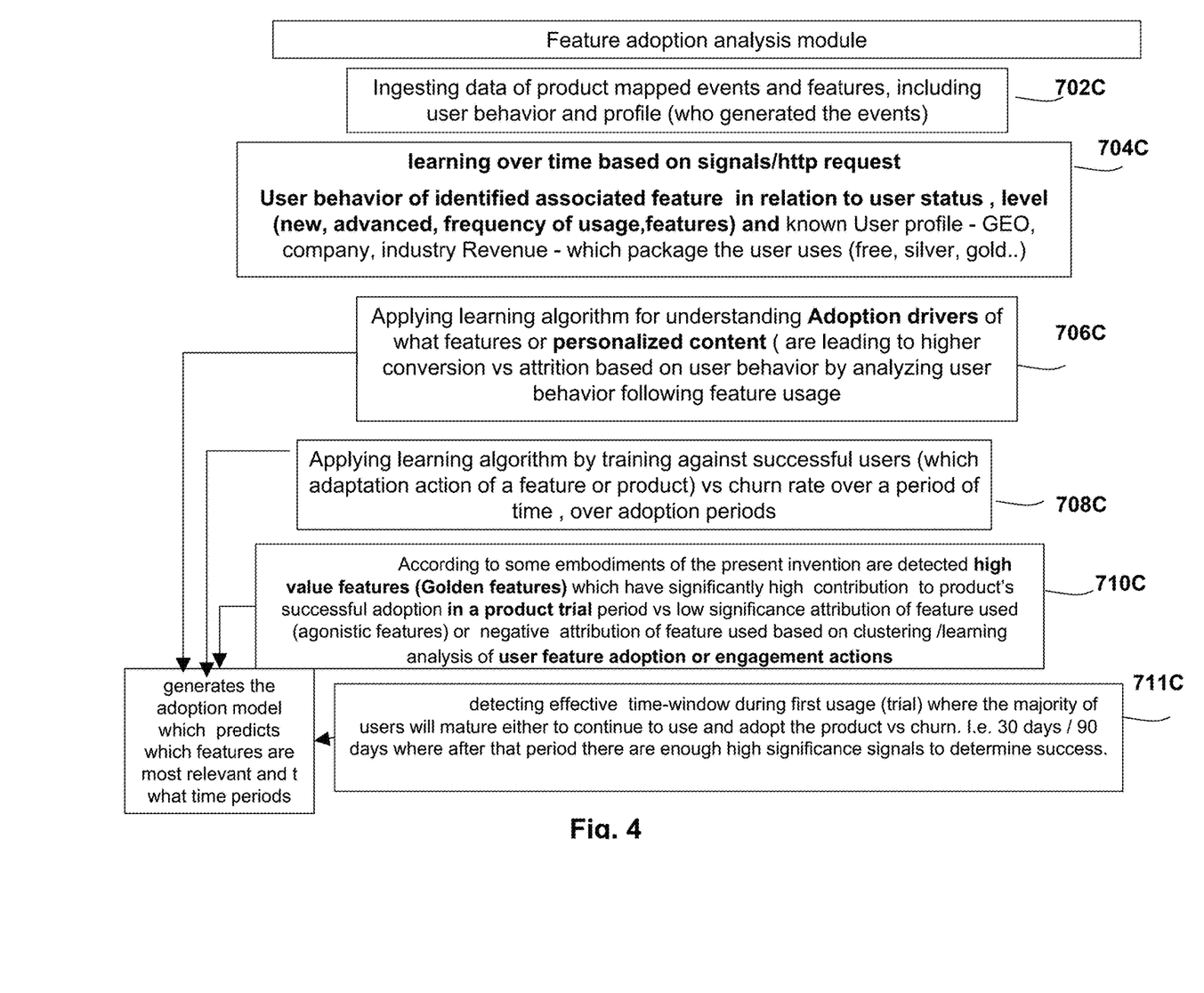
FIG. 4 is a flow diagram, depicting feature adoption module according to some embodiments of the present invention.

FIG. 4 is a flow diagram, depicting feature adoption module according to some embodiments of the present invention.

The Feature adoption analysis module (702C), ingests data of product mapped events and features, including user behavior and profile (of users who generated the events) (step 704C) and performs Learning (optionally over time) based on user signals, user behavior of identified associated features in relation to user status, level (new, advanced, frequency of usage, features) and User profile, demographics and firmographics—GEO, company, industry Revenue—which package the user uses (free, silver, gold.)

The modules applies learning algorithm for understanding Adoption drivers of what features or personalized content exposure are leading to higher conversion vs attrition based on user behavior by analyzing user behavior and feature usage (step 706C).

The learning algorithm is applied by training against successful users (which successfully adopted a feature, module or a product vs churn rate over a period of time, over adoption periods (step 708)

According to some embodiments of the present invention are detected high value features (Golden features) which have significantly high contribution to product's successful adoption in a product trial period vs low significance attribution of feature used (agonistic features) or negative attribution of feature used based on clustering/learning analysis of user behavior through feature adoption process or engagement actions within the process or after the adoption process (step 710C).

According to some embodiments of the present invention are detected effective time-window during first usage (trial) where the majority of users will mature either to continue to use and adopt the product vs churn. i.e. 30 days/90 days where after that period there are enough high significance signals to determine success.

Based on input of at least some of the above steps the system generates the adoption model having features which are the most relevant features and which have high likelihood to be adopted by each individual user. Optionally the model provides estimation of the preferred time periods or time-windows for adoption, based on user profile and current context of user within the application.

According to some embodiments of the present invention it is suggested aggregate data of features level report based on tree format—where usage statistics are rolled up to module level and presented as tree format based report.

According to some embodiments of the present invention provides adoption level ratio between a selected module vs addressable audience, addressable audience are all the users who were active and fit the relevant audience represented by the report filter which means they are relevant users to that feature.

According to some embodiments of the present invention is it suggested mapping one to Many relationships with mapped users and account events. This mapping may show that many different events can point to a single feature.

Figure 5:
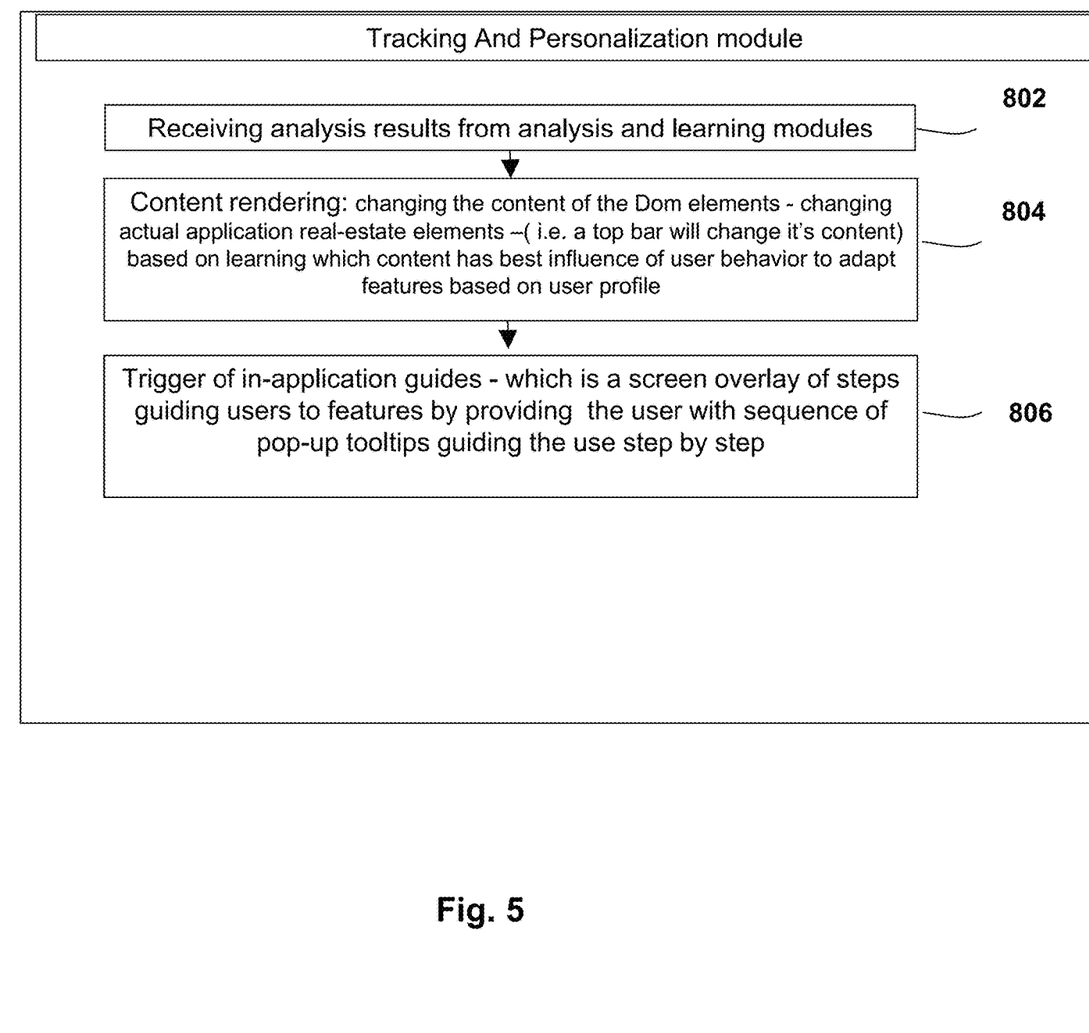
FIG. 5 is a flow diagram, depicting tracking and personalization module according to some embodiments of the present invention.

FIG. 5 is a flow diagram, depicting tracking personalization module according to some embodiments of the present invention.

The personalization module (80), receives analysis results from analysis and learning modules (step 802) of what changes in the content of the Dom elements are recommended—for changing actual application elements—(i.e. a top bar will change it's content) based on learning which content has best influence of user behavior to adapt features based on user profile (step 804)

According to some embodiments of the present invention are provided triggers of in-application guides (AKA product tours)—which is a screen overlay of steps guiding users to features by providing the user with pop up screens guiding the use step by step (step 806).

Figure 6:
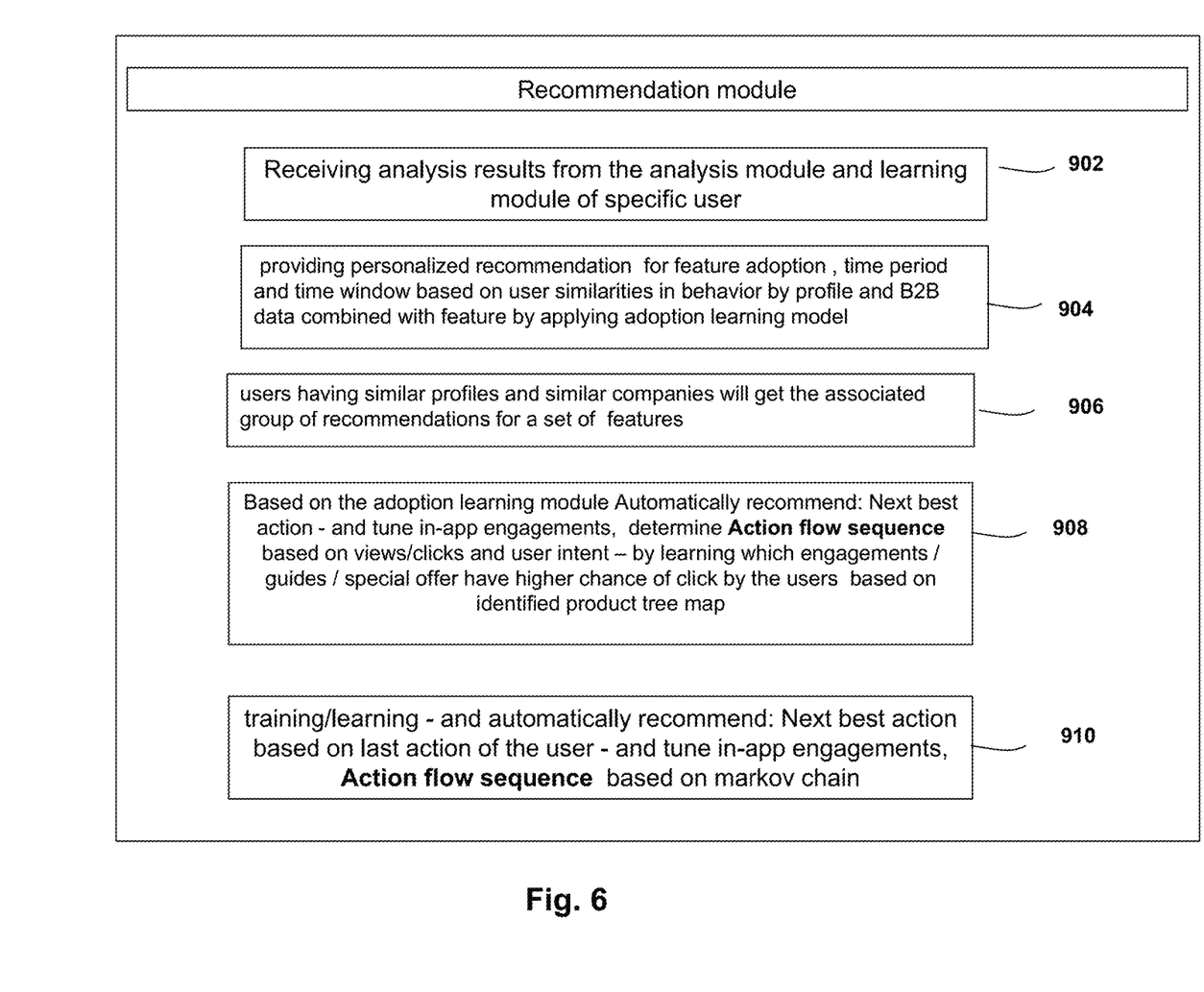
FIG. 6 is a flow diagram, depicting recommendation module according to some embodiments of the present invention.

FIG. 6 is a flow diagram, depicting recommendation module according to some embodiments of the present invention.

Recommendation module, (90) receives analysis results from the analysis module and learning module and provides personalized recommendation for feature adoption, time period and time window based on user similarities, using behavioral similarities, profile similarities and account (organization) data combined with feature by applying adoption learning model (step 904).

Based on the adoption learning module, users having similar profiles and similar companies will get the associated group of recommendations for a set of features. (step 906)

Based on the adoption learning module Automatically recommend: Next best action—and tune in-app engagements, determine Action flow sequence based on views/clicks and user intent—by learning which engagements/guides/special offer have higher chances of being clicked by the users based on identified product feature mapper (step 908)

According to some embodiments of the present invention the training or learning phase include automatically recommend of Next best action based on last action of the user—and tune in-app engagements, Action flow sequence based on Markov chain (step 910)

According to some embodiments of the present invention it is suggested triggering personalized user engagement based on feature match under the hierarchy. For Example: User that used Module A of the application is triggered in real-time with onboarding welcome in relation to Module A. Each module of the application can point to a list of sub modules and features. When building an in-app engagement campaign a rule can be defined automatically on the top module level, automatically including all contained features, eliminating the need to define a rule containing all its' features.

When writing a rule relevant to the usage of a top level module, the rule is automatically associated to any lower level features under the top module level. Those rules are used to trigger in-app engagements or represent a collection of features when measured in analytics.

Figure 7:
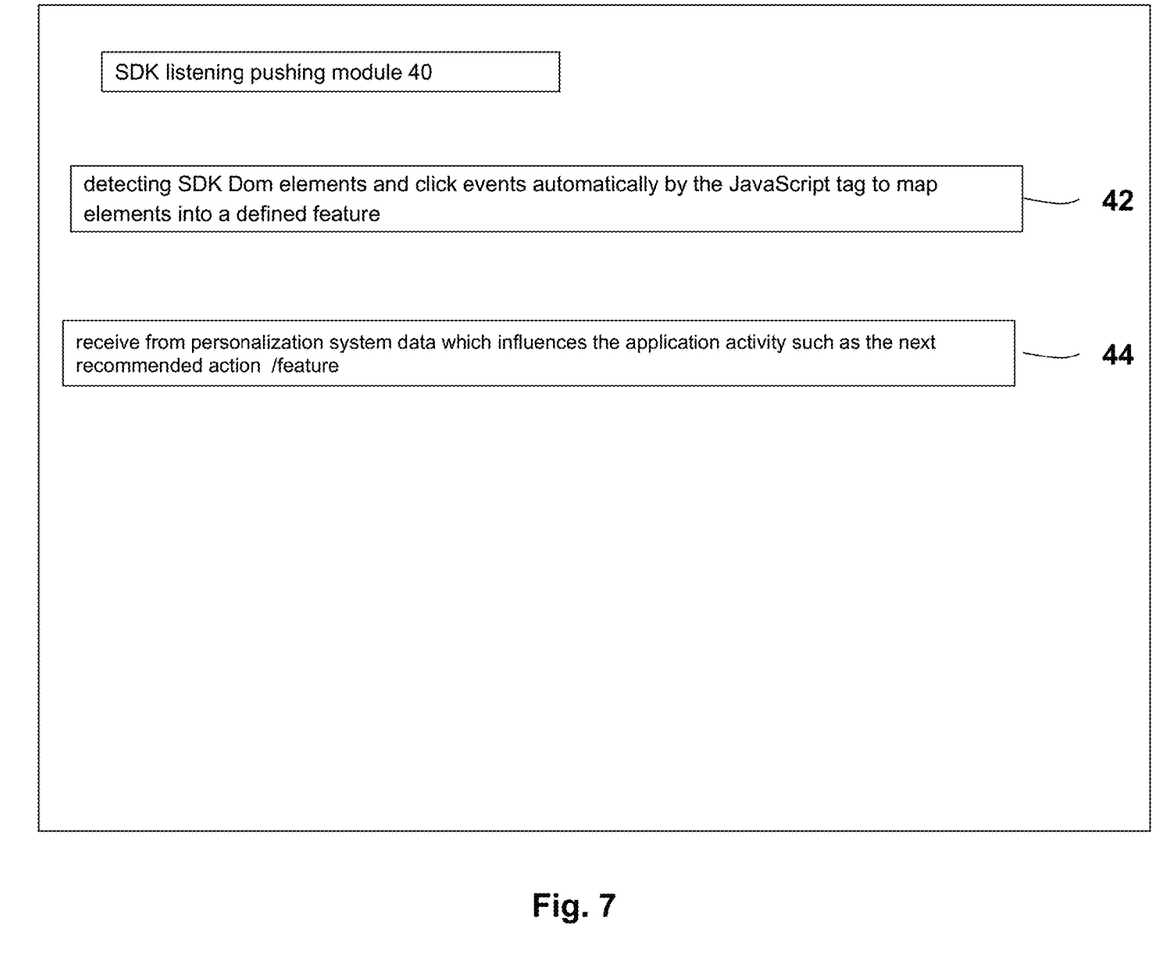
FIG. 7 is a flow diagram, SDK listening/pushing module according to some embodiments of the present invention.

FIG. 7 is a flow diagram, SDK tracking and displaying module 40 according to some embodiments of the present invention.

The module is configured to detect SDK Dom elements and click events automatically by the JavaScript tag to map elements into a defined feature (step 422).

receive from personalization system data which influences the application activity such as the next recommended action/feature (step 42)

Figure 8:
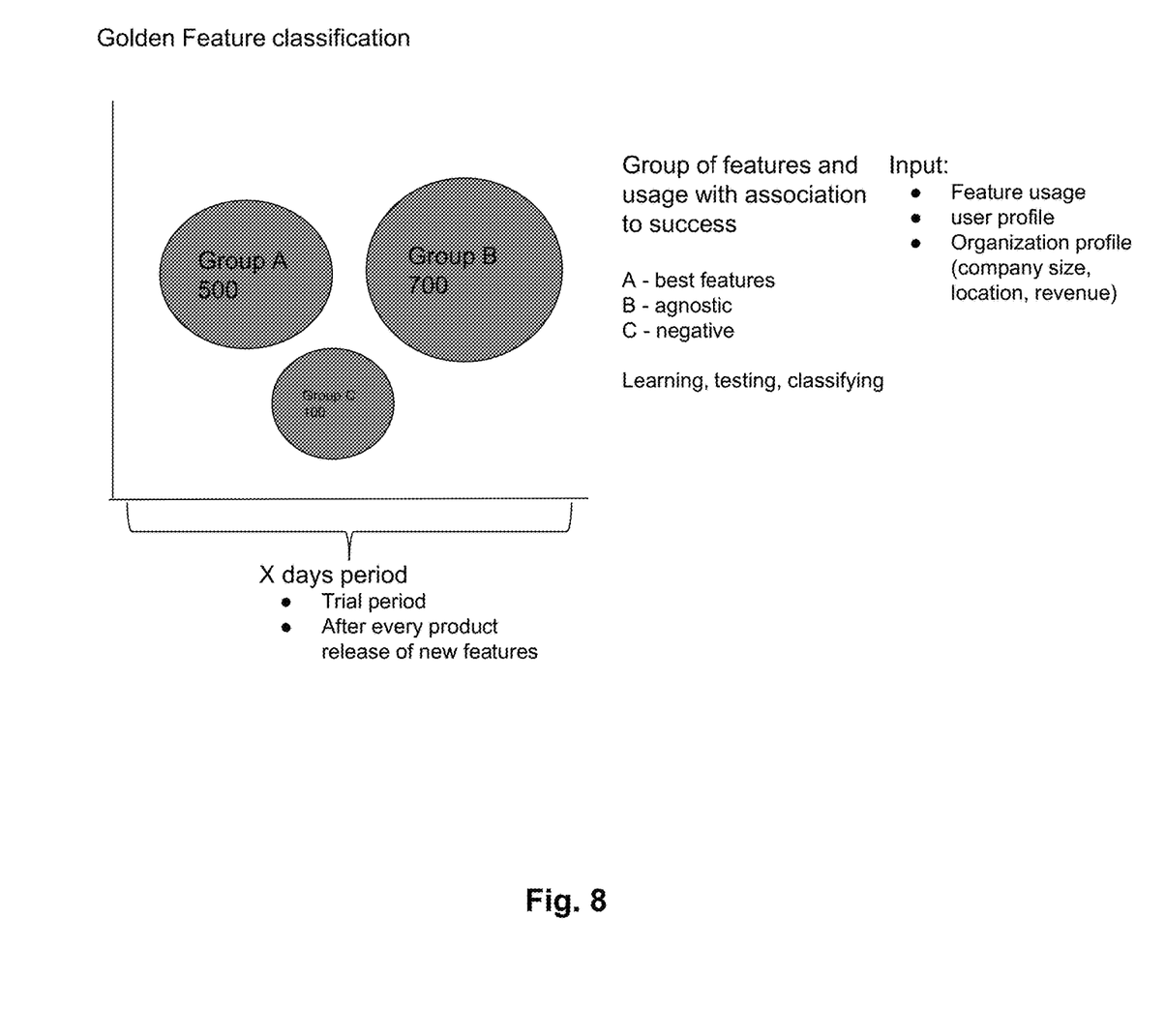
FIG. 8 is a graph depicting an example of feature clustering according to some embodiments of the present invention.

FIG. 8 is a graph depicting an example of feature clustering according to some embodiments of the present invention.

Figure 9:
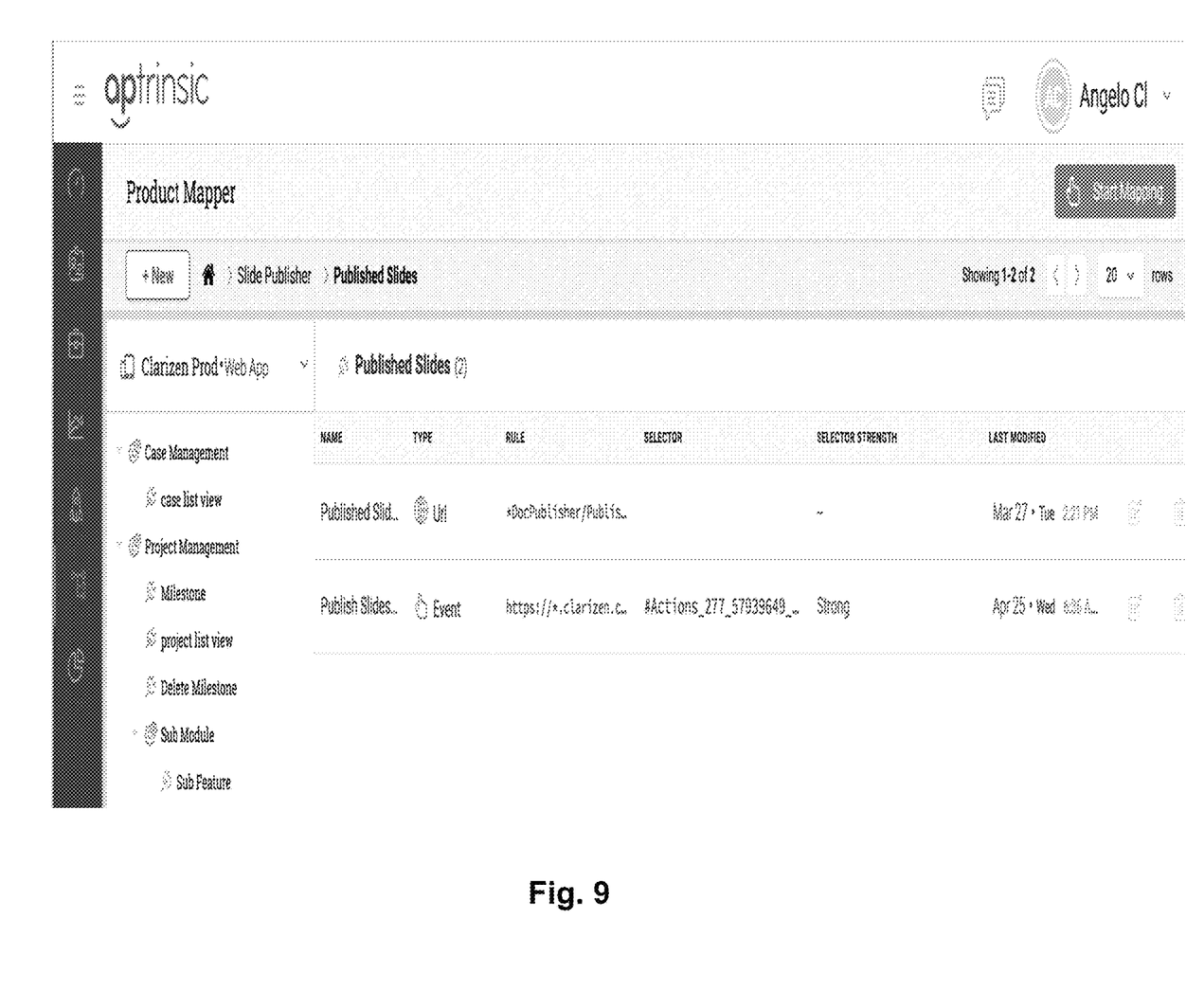
FIG. 9 depicts the product tree created and managed by the user. The tree can have N level hierarchy containing sub modules and features.

FIG. 9 depicts the product tree created and managed by the user. The tree can have N level hierarchy containing sub modules and features. Each feature is represented by a set of elements and rules that are used by the tracking system to associate user action/clicks with the features in each level.

Figure 10:
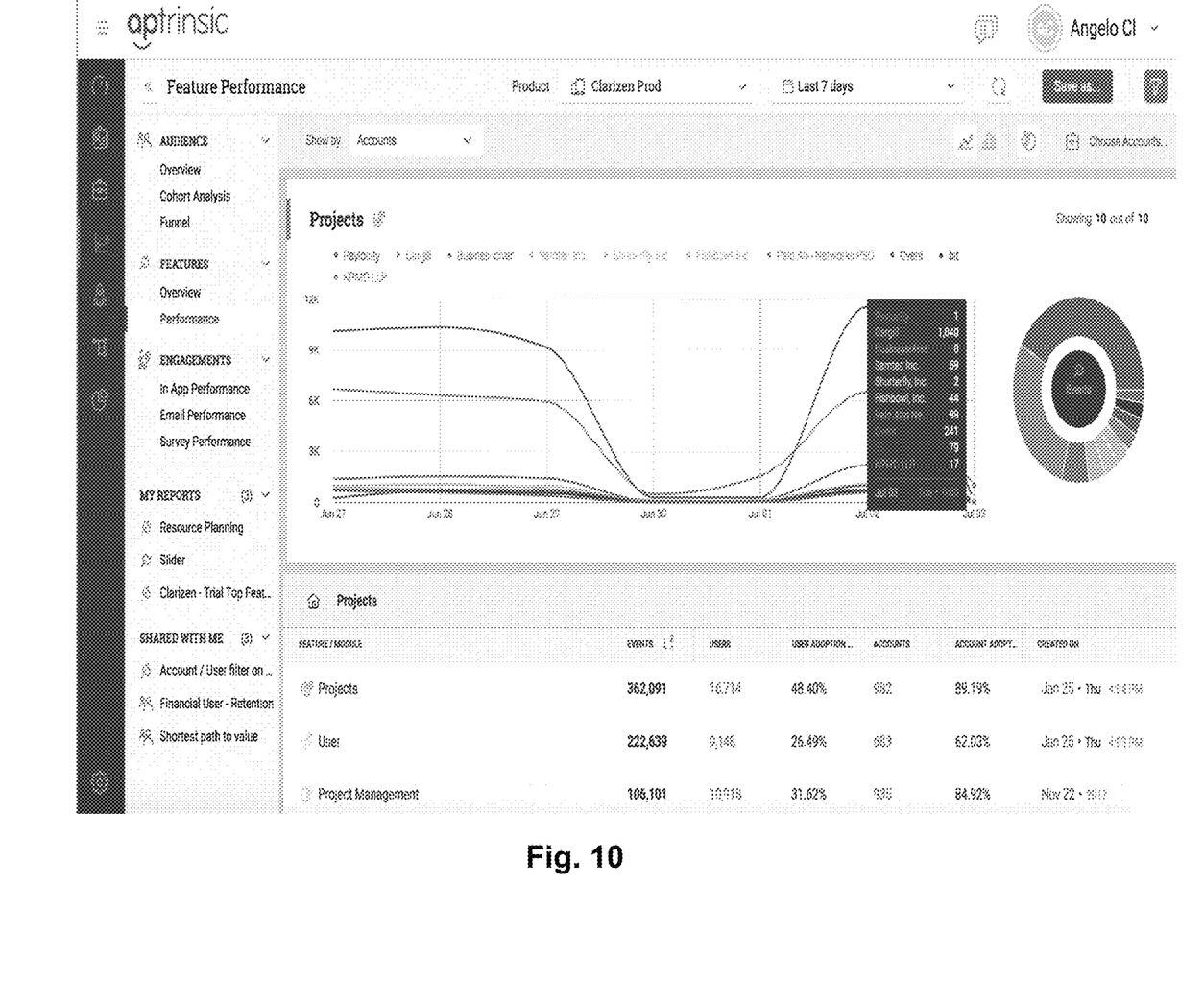
FIG. 10 depicts an example of report showing graph of features performance of user at different application, functionality levels.

FIG. 10 depict an example of report showing graph of features performance of user at different application, functionality levels; The time series represents features used over time, the bar chart represents accumulative view of usage. The table below represent the modules and features usage statistics based on the product tree hierarchy, clicking on each module will enter the underlying features and show their status as well.

Figure 11:
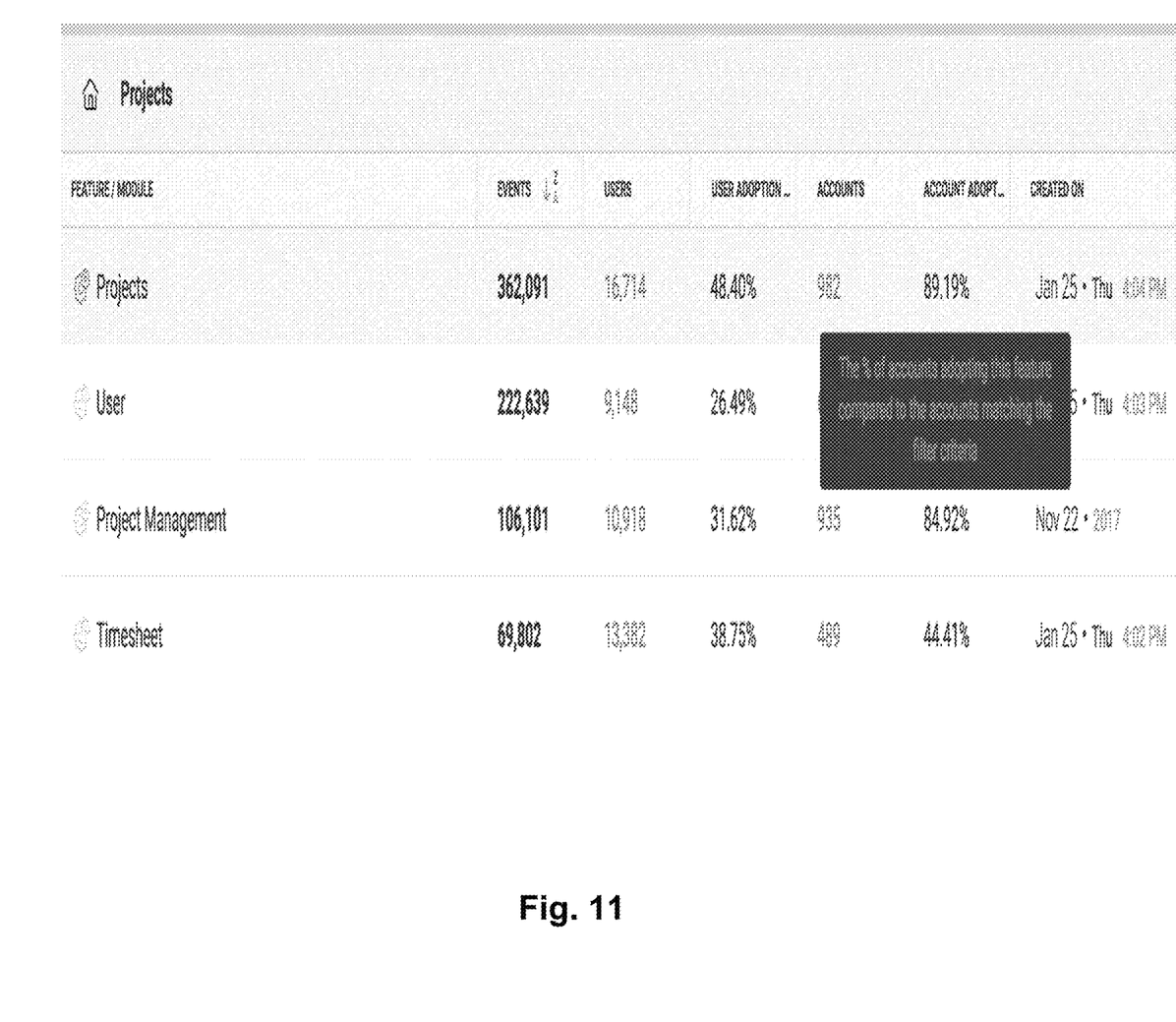
FIG. 11 is depicts an example of report user adaption ratio comparing users who used the features vs users who are exposed to those features, active at that time period but did not use the features.

FIG. 11 is depicts an example of report user adaption ratio which present comparison between users who used the features vs users who are exposed to those features, active at that time period but did not use the features;

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of he methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for scheduling and mapping functionality in a computer application implemented by one or more processors operatively coupled to a non-transitory computer readable storage device, on which are stored modules of instruction code that when executed cause the one or more processors to perform the following steps:
  determining user behavior based on detected input and different types of feature usage based on analyzing communication requests and responses between a client device and application services, without requiring prior knowledge of coding of the application to track feature usage;
  wherein user behavior is determined based on learning through a training phase for the application associating detected different types of features with an identified unique identifier and analyzed event flows, clicks, and text elements, whereby no prior knowledge of coding is required;

creating a product adoption learning model based on learned user behavior and profile by applying a training algorithm of exposure feature usage pattern in relation to user behavior action following the feature usage of the user throughout a product lifecycle;

determining in real time a feature adoption schedule and time window based on user real-time current behavior during a time period while the feature adoption schedule is being determined, user profile and feature usage, by applying the adoption learning model.

2. The method of claim 1 wherein creating the adoption learning model further includes analyzing a user behavior action, after feature usage by identifying engagement or adoption actions indicating a successful usage of the application, feature or module.

3. The method of claim 1 wherein the creating the adoption learning model further includes identifying high value features which lead to successful and shorter time of feature adoption.

4. The method of claim 1 wherein the creation of the adoption learning model further comprises detecting an effective time window of feature adoption, by statistically analyzing a number of users adopting the feature within each time period.

5. The method of claim 1 wherein the user behavior learning further comprises analyzing a sequence of document object model (DOM) elements for identifying user actions and usage of features of the application, features or modules.

6. The method of claim 1 further comprising the step of detecting application features using a learning algorithm based on analyzing communication requests and responses between the client device and a personalization system.

7. The method of claim 1 further comprising the step of determining a next best action by applying the adoption learning model based on user current behavior, user profile and feature usage.

8. The method of claim 1 further comprising, on each product release, auto-detecting unique identifiers within a DOM page which are associated with the product release features or actions and automatically recomputing the identifiers in case of a change.

9. The method of claim 8 further comprising the step of detecting features/actions applied by analyzing sequences of detected unique identifiers.

10. The method of claim 1 wherein the user behavior learning comprises using cascading style sheets (CSS) selectors for identifying unique identifiers within a DOM page based on Xpath navigation through an HTML/XML document, CSS class, HTML ID or relative path anchor elements, whereby prior knowledge of the features or coding of the application is not required.

11. The method of claim 1 further comprising the step of creating a product tree, wherein the tree has a multiple level hierarchy containing sub modules and features visualizing feature usage patterns, wherein each feature is represented by a set of elements and rules that are used by a tracking system to associate user action/clicks with the features in each level.

12. A system for scheduling and mapping functionality in a computer application, said system comprising a non-transitory storage device and one or more processing devices operatively coupled to the storage device on which are stored modules of instruction code executable by the one or more processors, the system comprising:

a learning module for determining user behavior based on detected input and different types of feature usage based on analyzing communication requests and responses between a client device and application services, without requiring prior knowledge of coding of the application to track feature usage;

wherein user behavior is determined based on learning through a training phase for the application associating detected different types of features with an identified unique identifier and analyzed event flows, clicks, and text elements, whereby no prior knowledge of coding is required;

a feature adoption analysis module creating a product adoption learning model based on user behavior and profile by applying a training algorithm of feature usage in relation to user behavior action and following the feature usage of the user throughout a product lifecycle;

a feature recommendation module for determining in real time a feature adoption schedule and time window based on user real-time current behavior during a time period while the feature adoption schedule is being determined, user profile and feature usage, by applying the adoption learning model.

13. The system of claim 12 wherein the adoption learning model analyzes user behavior action, after feature usage by identifying engagement or adoption actions indicating a successful usage of the application, feature or module.

14. The system of claim 12 wherein the adoption learning model identifies high value features which lead to successful and shorter time of feature adoption.

15. The system of claim 12 wherein the adoption learning model detects an effective time window of feature adoption, by statistically analyzing a number of users adopting the feature within each time period.

16. The system of claim 12 wherein the user behavior learning comprises analyzing a sequence of DOM elements for identifying user actions and usage of features of the application, features or modules.

17. The system of claim 12 wherein the learning module further comprising the step of detecting application features using a learning algorithm based on analyzing communication requests and responses between the client device and a personalization system.

18. The system of claim 12 wherein the feature adoption analysis module personalizes content and determines a next best action by applying the adoption learning model based on user current behavior, user profile and feature usage.

19. The system of claim 12 wherein on each product release unique identifiers are auto-detected and the identifiers are automatically recomputed in case of a change.

20. A method for mapping functionality in a computer application implemented by one or more processors operatively coupled to a non-transitory computer readable storage device, on which are stored modules of instruction code that when executed cause the one or more processors to perform the following steps:

determining user behavior based on detected input and different types of feature usage based on analyzing communication requests and responses between a client device and application services, without requiring prior knowledge of coding of the application to track feature usage;

wherein user behavior is determined based on learning through a training phase for the application associating detected different types of features with an identified unique identifier and analyzed event flows, clicks, and text elements, whereby no prior knowledge of coding is required;

applying a training algorithm of exposure feature usage pattern in relation to user behavior action following a sequence of feature usage of the user for identifying action flow patterns of different types of feature usage;

creating a product tree and usage flow using the identified action sequences/learnt patterns of different types of feature usage, based on learning algorithm products, wherein the tree has a multiple level hierarchy containing sub modules and features visualizing feature usage patterns, wherein each feature is represented by a set of elements and rules that are used by a tracking system to associate user action/clicks with the features in each level; and based on an adoption learning module automatically recommending a next best action and tune in-application engagements, determining an action flow sequence based on views or clicks and user intent, by learning which engagements, guides, or special offers have higher chances of being clicked by users based on an identified product feature mapper.

\* \* \* \* \*